Aug. 4, 1964  D. C. KINNEY  3,143,043
SPRING BIASED DIAPHRAGM DEVICE
Filed April 3, 1961

INVENTOR.
DAVID C. KINNEY
BY Whittemore
Hulbert & Belknap
ATTORNEYS

United States Patent Office 3,143,043
Patented Aug. 4, 1964

3,143,043
SPRING BIASED DIAPHRAGM DEVICE
David C. Kinney, East Detroit, Mich., assignor to Holley Carburetor Company, Warren, Mich., a corporation of Michigan
Filed Apr. 3, 1961, Ser. No. 100,088
1 Claim. (Cl. 92—94)

The present invention relates generally to spring biased pressure responsive diaphragm devices and refers more particularly to the improvement therein comprising contouring the inner surface of a diaphragm housing to control the response of a spring biased diaphragm secured within the housing to a pressure differential at opposite sides thereof and therefore to control the movement of a piston attached to said diaphragm.

It is often desirable in devices such as carburetors and fuel pumps to provide a diaphragm the displacement of which is a not necessarily linear function of a variable pressure such as engine manifold pressure. In the past the non-linear displacement of such diaphragms has generally been accomplished through the use of complicated pressure sensitive devices and mechanical apparatus which are controllable in response to the variable pressure in question and which in turn impart the desired movement to the diaphragm. Such devices in the past have been expensive and sometimes unreliable.

Therefore it is one of the essential objects of the present invention to provide a simple, inexpensive and reliable pressure responsive diaphragm device the movement of which is a variable function of the pressure applied directly to said diaphragm.

More specifically it is one of the objects of the present invention to provide a diaphragm controlled piston rod wherein the movement of the diaphragm is controlled by contouring the surface of the diaphragm housing contacting the diaphragm during the displacement thereof to produce a predetermined variation in the effective diaphragm area during the displacement of the diaphragm and therefore a predetermined diaphragm displacement and a predetermined piston movement for specific pressure variations at different pressures.

Still more specifically it is one of the objects to provide a spring biased pressure responsive diaphragm sealed over a pressure chamber within a diaphragm housing and having a piston attached thereto wherein the movement of the diaphragm in response to a variation of the pressure on opposite sides thereof and therefore the displacement of the piston for a given pressure variation is determined by the contour of the surface of said diaphragm housing contacting said diaphragm on movement thereof.

Figure 1:
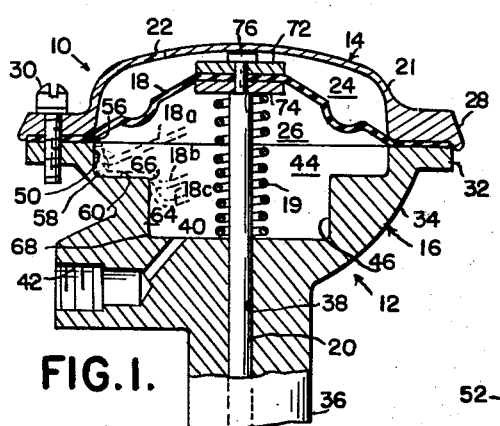
Figure 1A:
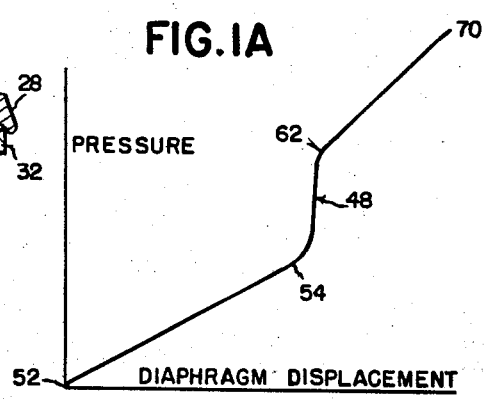

These and other objects and features of the invention will become apparent as the description proceeds, especially when taken in conjunction with the accompanying drawings, illustrating a preferred embodiment of the invention, wherein:

FIGURE 1 illustrates a spring biased diaphragm device for controlling the movement of a piston in response to a pressure differential at opposite sides of a diaphragm including a housing having the surface coming in contact with the diaphragm as it moves in response to the pressure differential contoured to control the movement of the diaphragm and attached piston according to the invention.

FIGURE 1-A is a diagram showing the displacement of the diaphragm of the device of FIGURE 1 as the pressure is varied at opposite sides of the diaphragm illustrating the non-uniform displacement of the diaphragm with a uniform pressure variation due to the contour of the inner surface of the diaphragm housing.

Figure 2:
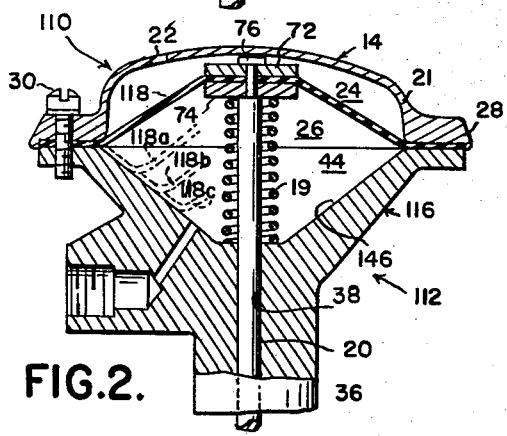
Figure 2A:
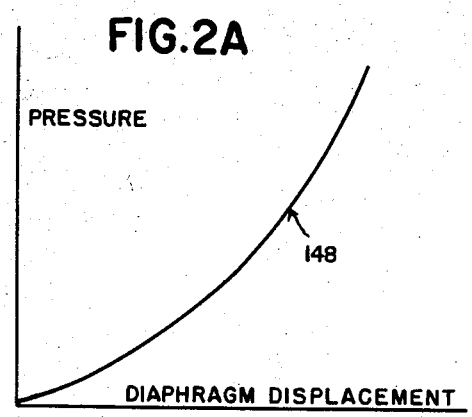

FIGURE 2 illustrates a modification of the device of FIGURE 1 having the diaphragm housing surfacing contacting the diaphragm as the diaphragm moves under a uniform pressure variation contoured differently.

FIGURE 2–A illustrates the non-uniform displacement of the diaphragm of the device of FIGURE 2 as the pressure is varied uniformly on the diaphragm.

Figure 3:
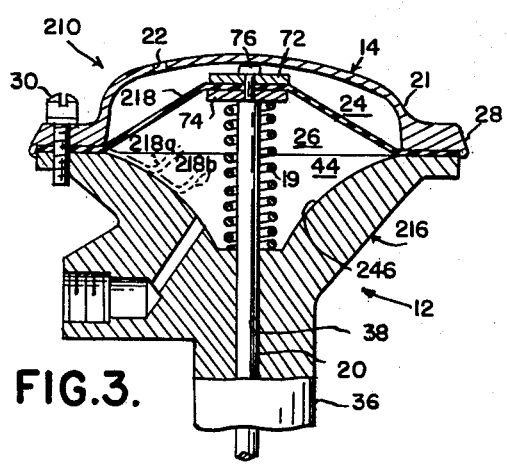
Figure 3A:
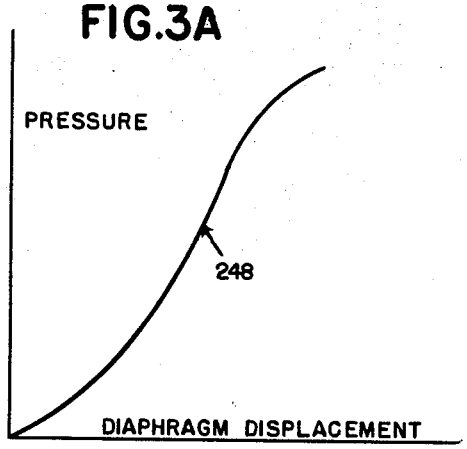

FIGURE 3 is another modification of the device of FIGURE 1 having yet a differently contoured diaphragm housing inner surface.

FIGURE 3–A illustrates the non-uniform displacement of the diaphragm of the device of FIGURE 3 as the pressure is varied uniformly on the diaphragm.

The embodiment of the spring biased diaphragm device generally indicated 10 shown in the figures is particularly adapted to the control of a piston rod in accordance with a variable pressure. As shown the device 10 includes a diaphragm housing generally indicated 12 including a cover 14 and a base 16, a diaphragm 18 secured between the cover 14 and base 16, a piston rod 20 attached to the diaphragm 18 and a spring 19 biasing the diaphragm 18 toward cover 14. In operation as pressure is varied on opposite sides of the diaphragm the diaphragm is displaced causing the piston to be displaced. The displacement of the diaphragm and therefore of the piston for a particular pressure differential on opposite sides of the diaphragm is according to the invention controlled by contouring the inner surface of the diaphragm housing 12.

More particularly the modification 10 of the invention shown in FIGURE 1 includes a diaphragm housing cover generally indicated 14 which as shown is generally circular in horizontal cross-section and includes dish shaped section 21. The housing cover 14 is provided with a vent 22 in the dish shaped section 21 between the chamber 24 of the space 26 within the diaphragm housing and the free atmosphere outside of the diaphragm housing. Vent 22 is provided to maintain the pressure in the chamber 24 of the space 26 at atmospheric pressure. Cover 14 is also provided as shown with an annular flange 28 which in conjunction with screws 30 and mating flange 32 on base 16 provides means for securing the cover 14 and base 16 of the diaphragm housing 12 together and also provides means for clamping diaphragm 18 in position between flanges 28 and 32 as shown.

The housing base 16 shown in FIGURE 1 includes annular flange 32 referred to above, a dish shaped section 34 similar to cover section 21, and stem section 36. Stem section 36 is provided with a bore 38 therethrough through which piston rod 20 extends. Bore 38 may as shown provide a guide for rod 20. Also, in the bottom of dish shaped section 34 of base 16 a port 40 is provided leading to a vacuum line connection 42. In operation of the device 10 a partial vacuum is produced in the chamber 44 of the space 26 in the diaphragm housing by withdrawing air therefrom through port 40.

The inner surface 46 of the dish shaped section 34 of base 16 of FIGURE 1 is contoured in right angle steps as shown. According to the invention the surface 46 is contoured to control the movement of the diaphragm 18 and therefore the movement of piston 20 attached thereto in response to a withdrawal of air from the chamber 44.

In this regard it has been found by experimentation that the movement of a spring biased diaphragm such as 18 in a structure such as that shown in response to a difference of pressure between chamber 44 and chamber 24 is a function of the effective area of the diaphragm 18 exposed to the pressure differential. The effective area of the diaphragm 18 has been determined to be the projected area on a horizontal surface of that part of the diaphragm 18 which is not in contact with surface 46 of base 16. Since the area of the diaphragm 18 contacting the surface 46 is a function of the contour of the surface 46 and the difference in pressure in chambers 24 and 44 it can be seen and will later be illustrated that by proper contouring of the surface 46 of chamber 44 that the response of diaphragm 18 to a particular pressure variation between chamber 44 and chamber 24 may be controlled.

Diaphragm 18 as shown in FIGURE 1 is a molded diaphragm shaped as shown. It is essential that diaphragm 18 be of a flexible material to allow the diaphragm to follow the contours of surface 46 as it moves downward in response to a pressure change. The diaphragm need not however be as flexible as for example rubber is. Diaphragm 18 as previously mentioned is clamped between flanges 28 and 32 of the cover 14 and base 16 respectively of the device 10. Diaphragm 18 as shown divides the space 26 defined by the sections 21 and 34 of cover 14 and base 16 into chambers 24 and 44 as shown.

As shown in the figures, piston rod 20 is attached to the center of diaphragm 18 by plates 72 and 74 and bolt 76. Piston rod 20 is therefore displaced with diaphragm 18 and as described above the displacement thereof may be controlled by contouring the surface 46 of section 34 of base 16.

Spring 19 is provided in the device 10 acting between plate 74 and the surface 46 to bias the diaphragm 18 toward cover 14. It will be understood that spring 19 or other bias means for diaphragm 18 may be located externally of the diaphragm housing. The spring 18 in the examples cited is considered to have a linear displacement response to pressure applied thereto. Such linear response is of course not required for the practice of the invention herein disclosed however.

With specific reference to FIGURES 1 and 1–A it will now be shown that the device 10 of generally circular horizontal cross-section and having an interior surface 46 contoured in ninety degree steps as shown in FIGURE 1 will produce a diaphragm 18 response as shown by the pressure-displacement indicating line 48 in FIGURE 1–A. In FIGURE 1–A a linear pressure drop in chamber 44 of device 10 is indicated in an upward direction along the line designated pressure. Linear increase in displacement of diaphragm 18 and rod 20 from the position shown is indicated in a rightward direction along the line designated displacement in FIGURE 1–A.

As pressure is reduced in chamber 44 in FIGURE 1 diaphragm 18 and rod 20 are caused to move downward. As shown in FIGURE 1 diaphragm 18 in its downward movement assumes positions such as that illustrated at 18a. Such positions will not reduce the effective area of the diaphragm as previously defined since the upper portion 50 of the inner surface 46 of section 34 of base 16 is vertical as shown. Therefore as the pressure is reduced in even increments in chamber 44 from the pressure indicated at 52 in FIGURE 1–A to the pressure indicated at 54 therein the diaphragm 18 will be displaced in corresponding even increments as indicated by the straight line portion of FIGURE 1–A between points 52 and 54 corresponding to movement of the diaphragm 18 over surface 50 between points 56 and 58 as shown in section in FIGURE 1. The vertical rise of pressure-displacement indicating line 48 between points 52 and 54 in FIGURE 1 will of course be due to the bias of spring 19 which will be assumed to be linear as previously indicated.

When diaphragm 18 reaches point 58 it can be seen from FIGURE 1 with reference to position 18b of diaphragm 18 that the diaphragm in its downward movement will contact all of part 60 of surface 46 at once thereby causing a drastic reduction in the effective area of diaphragm 18 which is capable of reacting to further lowering of pressure in chamber 44. Therefore, as the pressure is further reduced in chamber 44 no further displacement of the diaphragm 18 or rod 20 will take place until the pressure is lowered sufficiently to cause the newly presented effective diaphragm area to be displaced. This pressure increase without diaphragm displacement is indicated between the points 54 and 62 in the pressure-displacement indicating line 48 of FIGURE 1–A.

When the diaphragm starts to move down again as represented at 18c in FIGURE 1 after a pressure corresponding to point 62 in FIGURE 1–A has been reached, the displacement of the diaphragm for a particular pressure drop in chamber 44 is less than that corresponding to similar pressure drops causing displacement between points 56 and 58 shown in FIGURE 1 on part 50 of surface 46. This is to be expected since the effective area of the diaphragm 18 is less than it was as the diaphragm traveled between points 56 and 58 on surface 46 as shown in the section view of FIGURE 1 and the spring is assumed to have a linear displacement response with respect to pressure applied thereto. The pressure-displacement indicating line 48 of FIGURE 1–A between points 62 and 70 therefore has a steeper slope than between points 52 and 54.

It will readily be appreciated that the vertical part of the pressure-displacement indication of FIGURE 1–A may be increased in length by extending the length of part 60 of surface 46 of section 34 of base 16 or moved up or down the indicating line 48 of FIGURE 1–A by shortening or lengthening the surface 50 or 64 between points 56 and 58 and points 66 and 68 as shown in section in FIGURE 1. In other words the displacement of the diaphragm 18 in response to a pressure change in chamber 44 may be controlled by the contouring of surface 46.

With specific reference to FIGURE 2, there is shown a spring biased diaphragm device 110 which is similar to the device 10 in all respects except that the contour of the surface 146 of the base 116 is different from the contour of the surface 46 of the base 16. Like portions of devices 10 and 110 are indicated by similar reference characters. The surface 146 of the base 116 of device 110 as illustrated is contoured in the form of a truncated cone having its base in the plane defined by the contacting surfaces of cover 14 and base 116. Such a surface contour will produce the pressure-displacement response of diaphragm 118 indicated by line 148 in FIGURE 2–A.

As shown by the successive positions of diaphragm 118 and 118a, 118b and 118c in FIGURE 2 the effective area of the diaphragm 118 will be progressively reduced as the diaphragm is lowered into contact with surface 146. This progressive reduction in the effective area of diaphragm 118 will in conjunction with the resistance to the diaphragm 118 offered by the spring bias means 19 produce the pressure-displacement response indicated in FIGURE 2–A. The effect of the spring 19 alone without reduction of the effective diaphragm area would be to produce a straight line 148 as shown in FIGURE 1–A between points 52 and 54 and points 62 and 70 on line 48. The conical surface 146 is therefore responsible for the particular arcuate configuration of line 148.

In a similar manner the inner surface 246 of device 210 has been contoured in the form of a truncated cone similar to surface 146 of device 110 and having the surface 246 convex toward the diaphragm 218 as shown in FIGURE 3. The other parts of device 210 are similar to those of devices 10 and 110 and have therefore been indicated with like numerals. The displacement of diaphragm 218 in response to a pressure differential on opposite sides of diaphragm 218 is indicated by a pressure-displacement line 248 in FIGURE 3–A. As with line 148 in FIGURE 2–A the particular curvature of the line 248 in FIGURE 3–A is due to the particular reduction in effective area of diaphragm 218 caused by contact of the diaphragm 218 with the surface 246 of the device 210 contoured as shown in FIGURE 3 on the lowering of the diaphragm 218.

From the illustrative examples of the different contouring of surfaces 46, 146 and 246 of bases 16, 116 and 216 shown in FIGURES 1–3 and the pressure-displacement relations resulting therefrom illustrated in FIGURES 1–A, 2–A and 3–A it should now be obvious that substantially any diaphragm and therefore piston movement which is desired as a result of creating differences in pressure on opposite sides of a diaphragm may be obtained by the proper contouring of the surface of the diaphragm housing which the diaphragm contacts in the movement thereof due to the pressure differences.

In the determination of a required contour for a surface such as 46, 146 and 246 to produce a desired response of a diaphragm such as 18, 118 or 218 an approximation may be made by referring to the FIGURES 1–3 and the respective pressure-displacement lines 48, 148 and 248 associated therewith. For example a straight line displacement of a diaphragm in response to a constant pressure change may be produced by a vertical contour as shown in FIGURES 1 and 1–A. No displacement in response to a pressure change may be produced by a horizontal contour also as shown in FIGURES 1 and 1–A. Various non-linear displacements in response to constant pressure changes are predictable from the FIGURES 2 and 2–A and 3 and 3–A. Exact diaphragm movement for particular surface contours due to constant or variable pressure changes may of course be determined by experiment.

While the particular embodiment of the invention shown and described relates to a vacuum-responsive diaphragm, it is readily apparent to those skilled in the art that the invention is equally applicable to any pressure differential responsive diaphragm device.

The drawings and the foregoing specification constitute a description of the improved spring biased diaphragm device in such full, clear, consise and exact terms as to enable any person skilled in the art to practice the invention, the scope of which is indicated by the appended claim.

What I claim as my invention is:

Structure for providing variable linear movement in response to a predetermined uniform pressure variation over a predetermined pressure range, comprising a housing having a recess therein with a concentric outer larger diameter portion and smaller inner diameter portion providing an annular abutment surface therebetween and forming surface contours in accordance with the variation in linear movement desired for predetermined pressure increments at pressures within said predetermined pressure range, a passage extending through said housing terminating substantially centrally of said recess, a flexible diaphragm having its periphery positioned around the periphery of said recess and including an area within its periphery large in comparison to the projected area of said recess for enabling the diaphragm to conform exactly to the surface of said recess on movement thereof toward said recess, a cover for said recess including an annular flange secured to said housing about the periphery of said recess for clamping the periphery of said diaphragm about the periphery of said recess between the housing and cover, said cover having an opening therein for providing atmospheric pressure between the cover and the diaphragm, a rod in said passage one end of which extends into said recess, a pair of annular plates positioned centrally of said diaphragm on opposite sides thereof and means extending through the annular plates and diaphragm and secured to said one end of said rod for fixedly securing said rod to said diaphragm centrally thereof for movement therewith, resilient means within said recess operable between the bottom of the recess and one of said plates for urging said diaphragm and rod outwardly of the recess toward said cover and means for connecting a vacuum source to said recess adjacent the bottom thereof for compressing the resilient means and conforming the flexible diaphragm to the contours of the recess to present a changing effective diaphragm area in said recess and thus control the linear movement of the rod in the passage in accordance with the force of the spring balanced by the vacuum drawn in the recess.

References Cited in the file of this patent

UNITED STATES PATENTS

| | | |
|---|---|---|
| 2,121,874 | Hodgkins | June 28, 1938 |
| 2,433,221 | Huber | Dec. 23, 1947 |
| 2,651,328 | Gamble | Sept. 8, 1953 |
| 2,697,352 | Umphrey | Dec. 21, 1954 |
| 2,738,808 | Hartzell | Mar. 20, 1956 |
| 2,935,063 | Zubaty | May 3, 1960 |
| 2,950,739 | Lofink | Aug. 30, 1960 |
| 2,974,640 | Lindbom | Mar. 14, 1961 |

FOREIGN PATENTS

| | | |
|---|---|---|
| 432,835 | Italy | Mar. 30, 1948 |